United States Patent
Chae et al.

(10) Patent No.: US 11,721,334 B2
(45) Date of Patent: Aug. 8, 2023

(54) METHOD AND APPARATUS FOR CONTROLLING DEVICE LOCATED A DISTANCE AWAY FROM A USER

(71) Applicant: LG ELECTRONICS INC., Seoul (KR)

(72) Inventors: Jong Hoon Chae, Seoul (KR); Minook Kim, Seoul (KR); Yongchul Park, Seoul (KR); Sungmin Han, Seoul (KR); Siyoung Yang, Seoul (KR); Sangki Kim, Seoul (KR); Juyeong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 16/810,013

(22) Filed: Mar. 5, 2020

(65) Prior Publication Data

US 2021/0174796 A1    Jun. 10, 2021

(30) Foreign Application Priority Data

Dec. 4, 2019 (KR) .................. 10-2019-0159875

(51) Int. Cl.
*G10L 15/22* (2006.01)
*G10L 15/02* (2006.01)
(Continued)

(52) U.S. Cl.
CPC ............. *G10L 15/22* (2013.01); *G06N 3/04* (2013.01); *G10L 15/02* (2013.01); *G10L 15/16* (2013.01);
(Continued)

(58) Field of Classification Search
CPC ......... G10L 15/22; G10L 15/02; G10L 15/16; G10L 15/187; G10L 25/18; G10L 25/84;
(Continued)

(56) References Cited

U.S. PATENT DOCUMENTS 9,424,841 B2 * 8/2016 Foerster .................. G10L 15/02
9,779,734 B2 * 10/2017 Lee .......................... G10L 15/24
(Continued)

FOREIGN PATENT DOCUMENTS

KR   10-2018-0069660 A   6/2018
KR   10-2019-0084003 A   7/2019

OTHER PUBLICATIONS

"Marxer, Barker, J., Alghamdi, N., & Maddock, S. (2018). The impact of the Lombard effect on audio and visual speech recognition systems. Speech Communication, 100, 58-68. https://doi.org/10.1016/j.specom.2018.04.006" (Year: 2018).*

(Continued)

*Primary Examiner* — Bhavesh M Mehta
*Assistant Examiner* — Nandini Subramani
(74) *Attorney, Agent, or Firm* — Birch, Stewart, Kolasch & Birch, LLP

(57) ABSTRACT

A method and apparatus for controlling a device according to an embodiment of the present disclosure may be based on a speech feature of a user reflecting the Lombard effect so as to operate a device located far away from the user, among a plurality of electronic devices. As such, even when the user calls a device located far away from the user without any separate context information, speech recognition neural networks and weight calculation neural networks may be selected and used to operate the device located far away from the user, and reception of a speech signal of the user calling a device located far away from the user may be performed in an Internet of Things (IoT) environment using a 5G network.

19 Claims, 10 Drawing Sheets

(51) Int. Cl.
*G10L 15/16* (2006.01)
*G10L 25/90* (2013.01)
*G10L 25/84* (2013.01)
*G10L 25/18* (2013.01)
*G06N 3/04* (2023.01)
*G10L 15/187* (2013.01)

(52) U.S. Cl.
CPC ............ *G10L 15/187* (2013.01); *G10L 25/18* (2013.01); *G10L 25/84* (2013.01); *G10L 25/90* (2013.01); *G10L 2015/223* (2013.01)

(58) Field of Classification Search
CPC ... G10L 25/90; G10L 2015/223; G10L 25/30; G10L 25/48; G10L 15/04; G10L 25/15; G06N 3/04; G06F 3/167; G01S 5/30
See application file for complete search history.

(56) References Cited

U.S. PATENT DOCUMENTS

| 10,529,321 | B2* | 1/2020 | Shriberg | G06F 40/284 |
| 11,069,355 | B2* | 7/2021 | Lee | G10L 15/30 |
| 11,315,553 | B2* | 4/2022 | Kim | G06F 3/167 |
| 2012/0290297 | A1* | 11/2012 | Baughman | G10L 17/22 |
| | | | | 704/E15.039 |
| 2017/0083285 | A1* | 3/2017 | Meyers | G10L 15/00 |
| 2017/0125038 | A1* | 5/2017 | Hassani | G10L 13/033 |
| 2018/0268814 | A1* | 9/2018 | SaganeGowda | G10L 15/063 |

OTHER PUBLICATIONS

Kanno, Sukeyasu, and Testuo Funada. "Lombard Speech Recognition Based on Voiced Sound Detection and Application to the Fabric Inspection System in Factories." Systems and computers in Japan 34.7 (2003): 10-23. Web. (Year: 2003).*

Hansen, & Varadarajan, V. (2009). Analysis and Compensation of Lombard Speech Across Noise Type and Levels With Application to In-Set/Out-of-Set Speaker Recognition. IEEE Transactions on Audio, Speech, and Language Processing, 17(2), 366-378. https://doi.org/10.1109/TASL.2008.2009019 (Year: 2009).*

Marxer, Barker, J., Alghamdi, N., & Maddock, S. (2018) "The impact of the Lombard effect on audio and visual speech recognition systems." Speech Communication, 100, 58-68. (Year: 2018).*

Kanno, Sukeyasu, and Testuo Funada. "Lombard Speech Recognition Based on Voiced Sound Detection and Application to the Fabric Inspection System in Factories." Systems and computers in Japan 34.7 (2003): 10-23. (Year: 2003).*

* cited by examiner

UTTERANCE TIME INCREASE OF VOWEL SECTION

RISE OF BASE FREQUENCY

HARMONIC STRUCTURE CLARITY INCREASE

SPECTRUM SLOPE DECREASE
(MIDDLE AND HIGH ENERGY INCREASE)

METHOD AND APPARATUS FOR CONTROLLING DEVICE LOCATED A DISTANCE AWAY FROM A USER

CROSS-REFERENCE TO RELATED APPLICATION

This present application claims the benefit of priority to Korean Patent Application No. 10-2019-0159875, entitled "Method and Apparatus for Controlling Device," filed on Dec. 4, 2019, in the Korean Intellectual Property Office, the entire disclosure of which is incorporated herein by reference.

BACKGROUND

1. Technical Field

The present disclosure relates to a method and device capable of grasping an intention of a user to call an electronic device located far away from the user even when context relationship information in an environment in which a plurality of electronic devices are disposed is not clear, using a speech recognition neural network reflecting the Lombard effect.

2. Description of Related Art

The following description is only for the purpose of providing background information related to embodiments of the present disclosure, and the contents to be described do not necessarily constitute related art.

A speech recognition device is a device for performing a speech recognition function. Recently, due to the development of mobile communication technology, various technologies are being developed to control Internet of Things (IoT) electronic devices by recognizing a spoken utterance of the user and using the result of analyzing the spoken utterance.

For example, when a user utters "Hi LG" as a calling speech for operating an IoT electronic device, the IoT electronic devices around the user receive the calling speech and analyze the calling speech in the form of a speech signal. Upon a determination that the calling speech is an operation signal for operating the IoT electronic device itself, the IoT electronic device wakes up to receive another command from the user.

Since a plurality of electronic devices within a range capable of receiving such a user's calling speech may receive the calling speech, there has been an issue in which not only a specific electronic device that the user intends to operate but also other electronic devices are activated.

Therefore, there is an issue in that, when uttering the calling speech, a user is required to move so as to be adjacent to the specific electronic device that he or she intends to operate, or continuously utter the calling speech until the specific electronic device that he or she intends to operate is activated.

Specifically, according to Korean Patent Application Publication No. 10-2019-0084003, an utterance position of a calling speech uttered by a user can be determined by obtaining direction information on the calling speech. Techniques for selecting speech recognition electronic devices close to the determined utterance position are described.

Although the above-mentioned document discloses a technology for selecting a speech recognition electronic device through the utterance position of the calling speech uttered by a user, a technology capable of selecting a specific electronic device that the user intends to operate among a plurality of electronic devices arranged differently from the user is not described.

In addition, according to Korean Patent Application Publication No. 10-2018-0069660, a technique for performing speech recognition through a conversation with a user is described.

Although the above-mentioned document discloses a technique for improving user convenience by simulating a technique of recognition and determination of the human brain to perform speech recognition through a conversation with a user, a technology of selecting a specific electronic device that the user intends to operate among a plurality of electronic devices arranged differently from the user is not described.

Accordingly, there is a need for a technology capable of recognizing the calling speech of a user who selects a specific electronic device to operate among a plurality of electronic devices. In particular, there is a need for a solution which, when an electronic device located far away from the user is selected as a specific electronic device that the user intends to operate, enables a determination that a calling speech uttered by the user is an operating signal for operating the electronic device located far away from the user, and other electronic devices are not activated.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to recognize a calling speech of a user who selects a specific device among a plurality of electronic devices.

Specifically, embodiments of the present disclosure are directed to enabling a user to select an electronic device located far away from the user as a device that the user intends to operate, and operate the selected device located far away from the user even when the user calls the device without any additional context information.

In addition, the embodiments of the present disclosure are directed to, when a device located far away from a user among a plurality of electronic devices is operated in response to the user's calling, determining whether the Lombard effect is reflected in a speech feature of the user, thereby allowing the device located far away from the user to be easily operated.

Specifically, upon a determination that the Lombard effect is reflected in a user speech feature user extracted from a user utterance, it can be determined that the user is calling a device located far away from the user. Based on this, upon a determination from the user speech feature reflecting the Lombard effect that the user is calling a device located far away from the user, a first device may be operated.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects of the present disclosure may be realized by means and combinations thereof set forth in claims.

A method for controlling a device according to an embodiment of the present disclosure may include receiving a user utterance collected by each of a plurality of electronic devices, measuring a distance between the user and the plurality of electronic devices, and analyzing a style of the user utterance based on a user speech feature extracted from the user utterance through a speech recognition neural network.

The user utterance style may refer to at least one user speech feature among an utterance speed, a pronunciation stress, a pause section, a pitch, a base frequency, an utterance time of a vowel section, a signal to noise ratio (SNR), or an intonation, extracted through a weight calculation neural network.

Subsequently, based on the analyzed utterance style and the distance between the plurality of electronic devices, it may be determined which device among a plurality of electronic devices the user utterance is calling, and based on the determination, the device that is the target of the user's calling may be controlled in an operation controlling process.

At this time, in order to determine which device among the plurality of electronic devices is being called, the extracted speech feature is compared with a speech feature of a pre-stored average utterance style for the user, a device is selected based on speech features that deviate from the average utterance style, and the operation of the selected device is controlled.

In addition, a method for determining a response of a first device to a user's calling according to another embodiment of the present disclosure may include receiving a user utterance, measuring a distance between the user and the first device, analyzing a style of the user utterance based on a user speech feature extracted from the user utterance through the speech recognition neural network. Thereafter, based on the analyzed user utterance style and the measured distance, it is determined whether the user utterance is calling the first device, and thereby determined whether to respond to the user's calling.

Specifically, even when a user calls a device located far away from the user without separate context information, the device located far away from the user may be operated.

Also, a device for determining a response to a user calling according to another embodiment of the present disclosure may include at least one processor and a memory connected to the processor.

Here, the memory may store commands configured to cause, when executed by the processor, reception of a user utterance, analysis of a style of the user utterance based on a user speech feature extracted from the user utterance through a speech recognition neural network, measurement of a distance between the user and a first device, determination of whether the user utterance is calling the first device based on the analyzed user utterance style and the measured distance, and determination of whether to respond to the user's calling based on the determination.

That is, the determination of whether to operate a device located far away from the user among a plurality of electronic devices may be based on a user speech feature reflecting the Lombard effect. This feature allows devices located far away from the user to be operated.

Other aspects and features than those described above will become apparent from the following drawings, claims, and detailed description of the present disclosure.

According to the method and apparatus for controlling a device according to embodiments of the present disclosure, even when a user calls a device located far away from the user without any separate context information, by selecting and using speech recognition neural networks and weight calculation neural networks so as to enable the user to operate a device far away from the user, the calling speech of the user who selects a device located far away from the user among a plurality of electronic devices can be recognized.

In addition, based on a user speech feature that reflects the Lombard effect, the device can be operated at a distance from the user. That is, it is possible to determine that the device located far away from the user is being called by applying the Lombard effect to the speech feature of the user. Based on this, if the user speech feature reflecting the Lombard effect is determined to be calling a device located far away from the user, the operation corresponding to the user's calling can be performed in the device located far away from the user.

The effects of the present disclosure are not limited to those mentioned above, and other effects not mentioned can be clearly understood by those skilled in the art from the following description.

DETAILED DESCRIPTION

Figure 1:
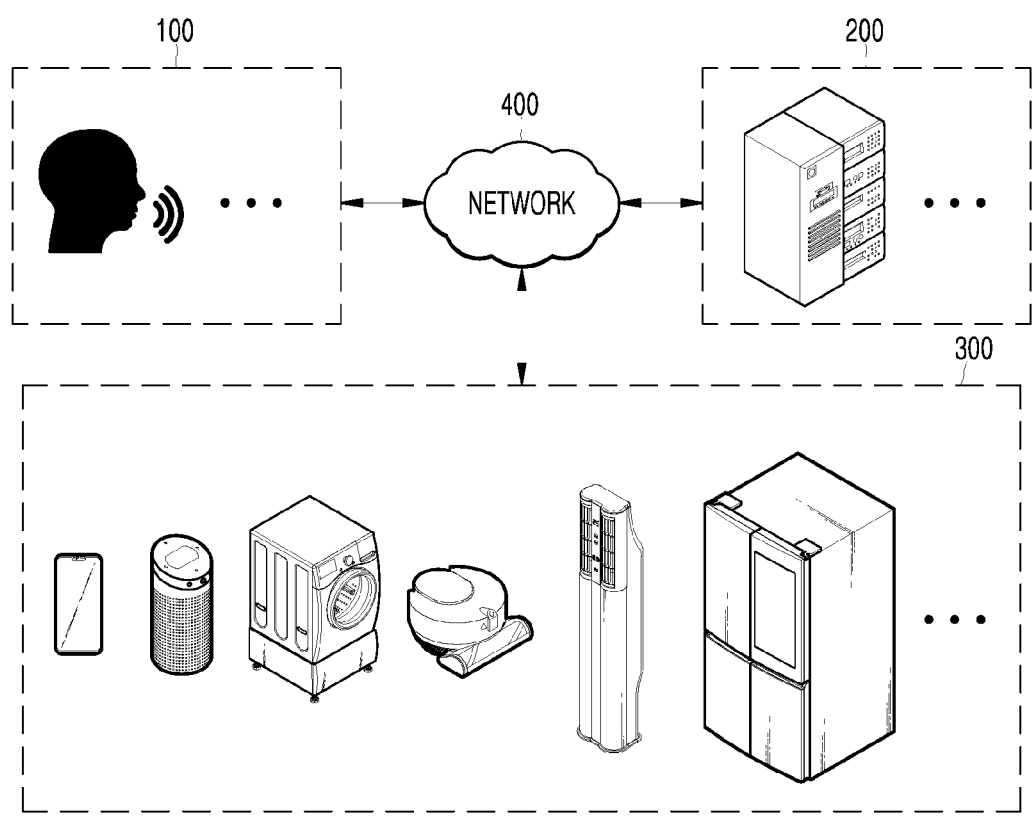
FIG. 1 is an exemplary diagram of a network environment for controlling a device according to a user's calling according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, the present disclosure will be described in more detail with reference to the drawings.

Figure 2:
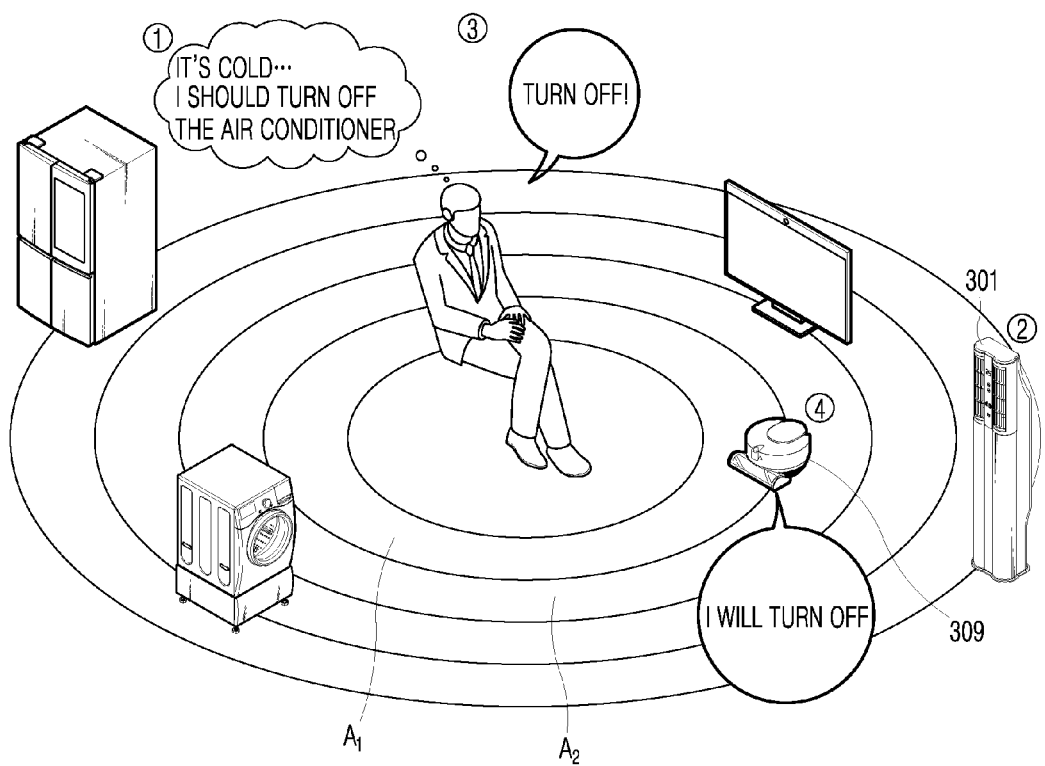
FIG. 2 is an exemplary diagram of an environment for controlling a device according to a user's calling according to an embodiment of the present disclosure.
Figure 3:
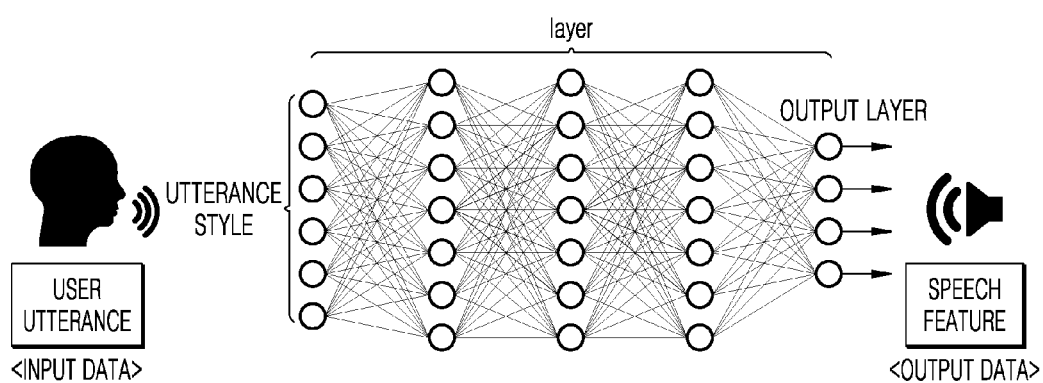
FIG. 3 is a view for explaining a speech recognition neural network according to an embodiment of the present disclosure.

FIG. 1 is an exemplary diagram of a network environment for controlling a device according to a user's calling according to an embodiment of the present disclosure. FIG. 2 is an exemplary diagram of an environment for controlling a device according to a user's calling according to an embodiment of the present disclosure. FIG. 3 is a view for explaining a speech recognition neural network according to an embodiment of the present disclosure.

Referring to the drawings, an environment for controlling a device according a user's calling according to an embodiment of the present disclosure includes a user 100 capable of spoken utterances, a plurality of electronic devices 300, a server 200, and a network 400 for allowing these components to communicate with each other.

The user 100 makes a spoken utterance toward a specific electronic device among the plurality of electronic devices 300. The spoken utterance of the user 100 may be a command for controlling the operation of the electronic device.

At this time, in relation to the spoken utterance of the user 100, the spoken utterance when calling an electronic device disposed at a long distance from the user 100 may be different from the spoken utterance when calling an electronic device disposed at a close distance to the user 100. A changed speech feature of the user 100 due to such difference is received in the plurality of electronic devices 300 or the server 200, and a specific electronic device being called by the user 100 is extracted according to the changed speech change feature of the user 100 through a speech recognition neural network, and thereafter operation of the extracted specific electronic device can be controlled.

For convenience of description, the specific electronic device will be described as a first device (see 301 of FIG. 2).

The plurality of electronic devices 300 can support object-to-object intelligent communication (such as Internet of Things (IoT), Internet of Everything (IoE), and Internet of Small Things (IoST)), and also can support, for example, machine to machine (M2M) communication and device to device (D2D) communication.

In addition, the plurality of electronic devices 300 may use big data, artificial intelligence (AI) algorithms, and/or machine learning algorithms in a 5G environment connected for the Internet of Things.

The plurality of electronic devices 300 may be configured to include a microphone so as to receive a spoken utterance of the user 100. That is, the operation of the first device 301 selected from the plurality of electronic devices 300 is selected based on the spoken utterance of the user 100 received through the microphone.

In the embodiment of the present disclosure, although an example in which the spoken utterance of a user 100 is received through a microphone in order to select an operation of the first device 301 is provided, for an operation of the first device 301, any one of various means such as a keyboard, a mouse, a touch screen, or a camera may be used for the user 100 to input an operation command for operating the electronic device, in addition to the microphone.

In addition, the plurality of electronic devices 300 may include a speech input/output interface, and may be configured to include an embedded system for the Internet of Things. Examples of the electronic devices 300 may include a user terminal or any one object disposed in a home performing an artificial intelligence assistant function. For example, the plurality of electronic devices 300 may be any one of, for example, a TV, an air conditioner, a robot cleaner, a refrigerator, or a washing machine as shown in FIG. 2, but the present disclosure is not limited in terms of the type of the electronic device 300 disposed.

When an utterance of the user 100 is received from the microphone of the electronic device 300, a speech feature of the received utterance of the user 100 may be extracted and analyzed. The speech feature of the analyzed user utterance may include data for determining whether the user utterance is specifically calling the first device 301 among the plurality of electronic devices 300.

The technology for extracting and analyzing speech features of the utterance of the user 100 may be achieved through artificial intelligence. Artificial intelligence technology may be generated through a training step by a training system (not shown) applied to the electronic device 300.

A training model generated by the training system is a speech recognition neural network, and may be trained to analyze speech features to output whether the utterance of the user 100 stored in each of the electronic devices 300 or received from the electronic devices 300 is specifically calling the first device 301, as a specific electronic device.

Typically, the training model may complete the training step in a separate server or a training system (not shown), and may be stored in the electronic device 300 in a state capable of determining whether the utterance of the user 100 is calling the first device 301. However, in some embodiments, the learning model may be implemented to be updated or upgraded through the plurality of electronic devices 300 through additional training.

Specifically, the server 200 receives the utterance of the user 100, analyzes and extracts the speech feature from the received utterance of the user 100, and then determines, through the analyzed speech feature, whether the first device 301 is specifically being called.

Such a server 200 may generally have greater processing capacity and greater memory capacity than the plurality of electronic devices 300. Thus, depending on the system implementation, a heavy learning model, which requires more processing power for application, may be configured to be stored in the server 200, and a lightweight learning model, which requires less processing power for application, may be configured to be stored in the plurality of electronic devices 300.

For convenience of description, an example is provided in which a spoken utterance of the user 100 is received from the server 200, a speech feature from the received spoken utterance is extracted and analyzed, and it is then determined whether the first device 301 among the plurality of electronic devices 300 is being called. However, alternatively, a spoken utterance of the user 100 may be received from each of the plurality of electronic devices 300, a speech feature from the received spoken utterance may be extracted and analyzed, and then it may then be determined whether the first device 301 located at a distance from the user 100 is being called.

Meanwhile, the plurality of electronic devices 300 may transmit and receive data with the server 200 through the 5G network. In particular, the electronic device 300 may perform data communication with the server 200 and a terminal via the 5G network by using at least one service of enhanced mobile broadband (eMBB), ultra-reliable and low latency communications (URLLC), or massive machine-type communications (mMTC).

eMBB is a mobile broadband service, and provides, for example, multimedia contents and wireless data access. In addition, improved mobile services such as hotspots and wideband coverage for accommodating the rapidly growing mobile traffic may be provided via eMBB. Through a hotspot, high-volume traffic may be accommodated in an area where user mobility is low and user density is high. A wide and stable wireless environment and user mobility can be secured by a wideband coverage.

The URLLC service defines requirements that are far more stringent than existing LTE in terms of reliability and transmission delay of data transmission and reception, and corresponds to a 5G service for production process automation in fields such as industrial fields, telemedicine, remote surgery, transportation, safety, and the like.

mMTC (massive machine-type communications) is a transmission delay-insensitive service that requires a relatively small amount of data transmission. mMTC enables a much larger number of terminals, such as sensors, than general mobile cellular phones to be simultaneously connected to a wireless access network. In this case, the communication module price of the terminal should be inexpensive, and there is a need for improved power efficiency and power saving technology capable of operating for years without battery replacement or recharging.

The network 400 may be a wired or wireless network, for example, a local area network (LAN), a wide area network (WAN), the Internet, an intranet and an extranet, and any suitable communication network including a mobile network, for example, cellular, 3G, 4G, LTE, 5G, and Wi-Fi networks, an ad hoc network, and a combination thereof.

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. The access to the network 400 may be provided via one or more wired or wireless access networks.

As described, the electronic device 300 and/or the server 200 of the embodiment of the present disclosure may store or include a deep neural network applied with artificial intelligence technology to determine which specific electronic device the user utterance is calling, or various learning models such as other types of machine learning models, or techniques that include these.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs may include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be a representative artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Representative examples of parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

The learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a learning method that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model creating new data that generate new data based on true data.

The discriminator may be a model recognizing patterns in data that determines whether inputted data is from the true data or from the new data generated by the generator.

Furthermore, the generator may receive and learn data that has failed to fool the discriminator, while the discriminator may receive and learn data that has succeeded in fooling the discriminator. Accordingly, the generator may evolve so as to fool the discriminator as effectively as possible, while the discriminator may evolve so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. In this case, since the number of nodes in the output layer is greater than the number of nodes in the hidden layer, the dimensionality of the data increases, thus data decompression or decoding may be performed.

Furthermore, in the AE, the inputted data may be represented as hidden layer data as interneuron connection strengths are adjusted through learning. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent may find an optimal path based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. The one-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be used to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, the momentum and NAG may also include methods that increase optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network may include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Figure 4:
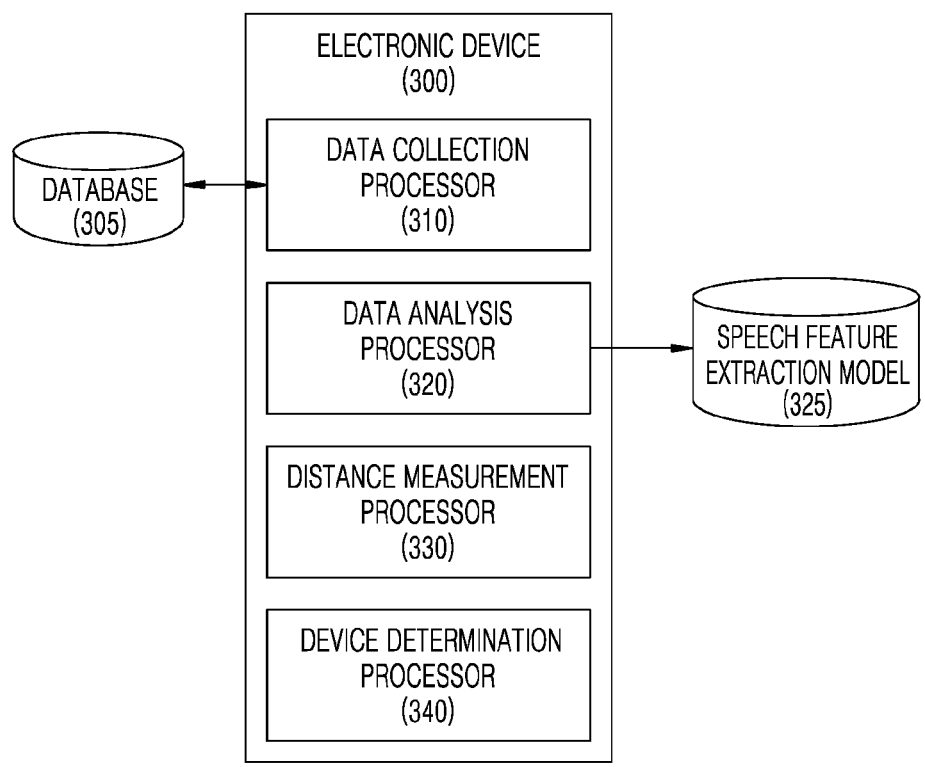
FIG. 4 is a view for explaining a system of a device that can be controlled by a user's calling according to an embodiment of the present disclosure.
Figure 5:
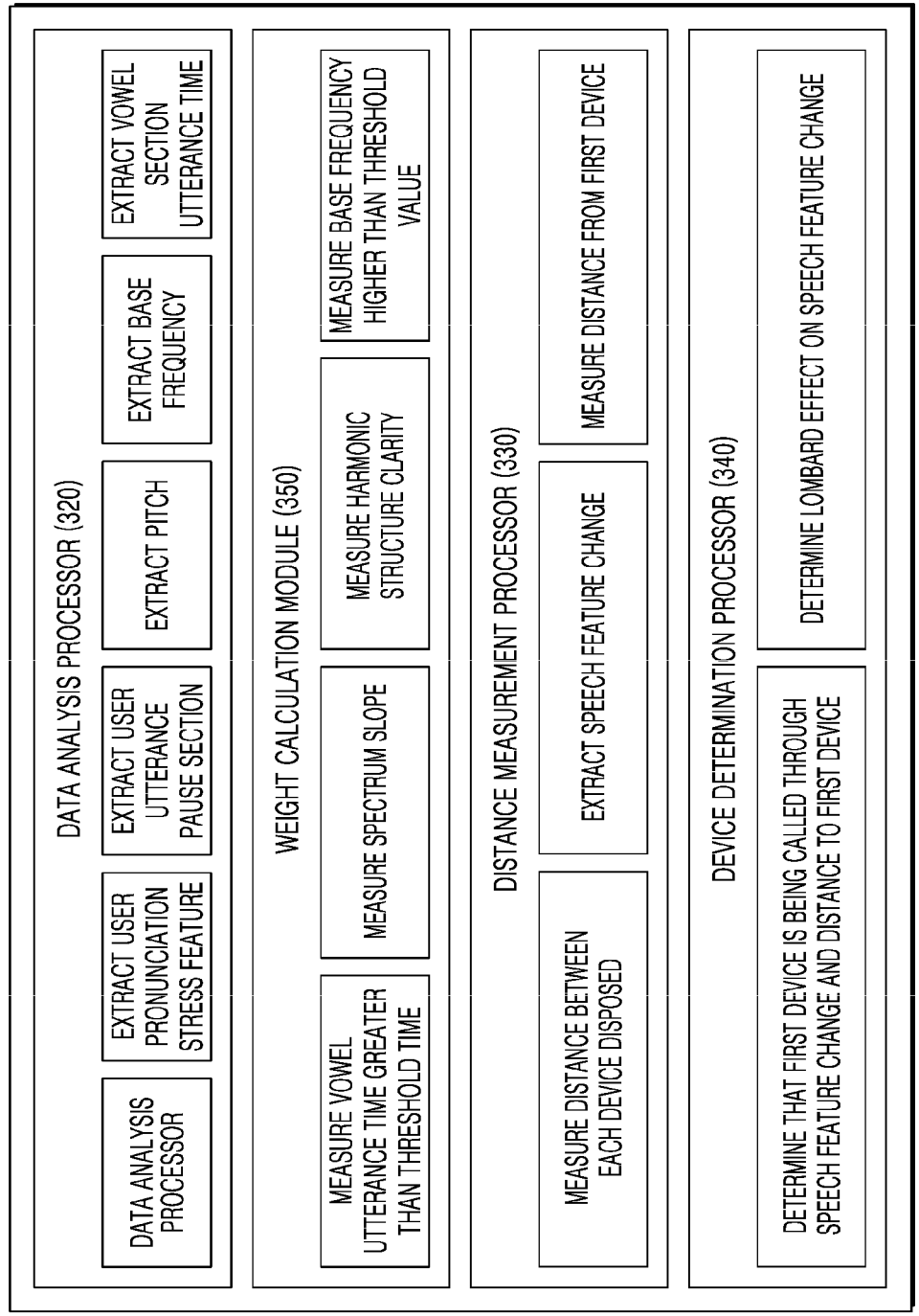
FIG. 5 is a diagram for specifically describing a configuration of the system of FIG. 4.

FIG. 4 is a view for explaining a system of a device that can be controlled by a user's calling according to an embodiment of the present disclosure. FIG. 5 is a diagram for specifically describing a configuration of the system of FIG. 4. FIG. 6A to 6D is a graph for exemplarily illustrating a feature of a user utterance for controlling a device by a user's calling according to an embodiment of the present disclosure.

The electronic device 300 may include a plurality of processors for performing a series of processes from input of the spoken utterance of the user to control of operations of the first device 301 determined by a speech feature of the inputted spoken utterance. Here, the processors constituting the electronic device 300 may be configured in the form of a single server, or each may be configured in the form of one or more servers.

Specifically, referring to the drawings, the electronic device 300 controlled by a user's calling includes a data collection processor 310.

The data collection processor 310 is a component that receives the spoken utterance of the user 100 through, for example, a microphone.

That is, the data collected by the data collection processor 310 may be a spoken utterance of the user 100, and the spoken utterance of the user 100 may be, for example, a command of which the context is not clear. Specifically, the command may be "Hi LG, turn off", or "Hi LG, turn down the sound".

Thereafter, the collected spoken utterance of the user 100 may be analyzed through a data analysis processor 320.

Specifically, through a speech feature extraction model 325 of the speech recognition neural network, a style of the user utterance may be analyzed based on the user speech feature extracted from the utterance of the user 100.

Here, the user speech feature refers to a change in the utterance of the user when the user utters a sentence or a word. The user speech feature can be used to infer whether the user is calling an electronic device located close to the user or a distant electronic device.

For this, the utterance style of the user can be extracted from the received user utterance. The utterance style may be, for example, a speed at which a user utters a sentence or word, a stress in which a certain uttered sentence or word is pronounced strongly or weakly, a pause time (section) between words, a pitch, and a vowel section utterance time of a word.

Through such an utterance style, it may be determined whether the user 100 is calling a device located at a distance far from the user 100 or a device located at a distance close to the user 100, among the electronic devices 300. For example, assuming that the user 100 is calling a device located at a distance far from the user 100 among the electronic device 300, since the distant device is required to operate according to the user's intention, the user 100 may make the spoken utterance calling the first device 301 with more accurate pronunciation. To the contrary, when the user 100 is calling a device located at a distance close to the user 100 among the electronic devices 300, the user 100 may make the spoken utterance with a relatively soft voice or at a high speed.

For example, as shown in FIG. 2, in a state where the first device 301, which is an air conditioner, is located farthest from the user, the user may utter "Turn off". At this time, "Turn off" as uttered by the user is to control the operation of the air conditioner located at a long distance, and features such as loudness or slow pronunciation may thus occur.

This is called the Lombard effect. The Lombard effect refers to a phenomenon by which speakers involuntarily change their way of speaking to be able to better hear their voice when speaking in a noisy environment. Where a speech feature reflecting the Lombard effect is present, it may be determined whether the user 100 is making the utterance toward the first device 301 located far away from the user 100.

When analyzing the spoken utterance of the user 100 collected through the data analysis processor 320, the extracted speech feature may be compared with the speech feature of an average utterance style previously stored for the user 100.

That is, the case where the Lombard effect is reflected in the user utterance may be different from the speech that the user normally utters. As described above, the spoken utterance of the user in which the Lombard effect is reflected includes features such as a long vowel sound or a long utterance time. However, since the speech that the user normally utters lacks these features, the average utterance style of the user is pre-stored in the electronic device 300 and/or the server 200, and by comparing the stored average utterance style of the user with the style of the user utterance calling the electronic device, it can be determined which electronic device the user is calling.

When analyzing utterance styles, user utterance data received by the electronic device located at the closest distance to the user may be selected among user utterance data collected in the plurality of electronic devices 300, and the speech recognition neural network may extract speech features of the user from the selected utterance data.

For example, as shown in FIG. 2, when the user utters "Turn off", the utterance received by the robot cleaner 309, which is the electronic device 300 located closest to the user, is analyzed by the data analysis processor 320.

In this case, when it is analyzed that the Lombard effect is reflected in the user utterance received by the robot cleaner 309, it may be determined that the robot cleaner 309 is not the electronic device 300 that is being called.

To the contrary, when the Lombard effect is not reflected in the user utterance received by the robot cleaner 309, and the user utterance is analyzed as being similar to the speech that the user normally utters, it may be determined that the user 100 is calling the robot cleaner 309, and the operation of the robot cleaner 309 may be controlled.

When the utterance style of the user 100 is analyzed, the distance between the user 100 and the electronic device 300 is measured through a distance measurement processor 330.

As an example of measuring a distance between the user 100 and the electronic device 300, distance information on the distance between the user 100 and each electronic device 300 obtained from a distance measurement sensor included in each of the electronic devices 300 may be collected.

Specifically, the electronic device 300 may include, for example, a vision sensor, a camera, and an infrared sensor, and the distance between the user 100 and each electronic device 300 may be measured using the disclosed vision sensor, camera, and infrared sensor.

Based on the distance information on the distance between the user 100 and each electronic device 300 obtained from the distance measuring sensor, the distance between the user 100 and each of the plurality of electronic devices 300 may be estimated.

Estimating the distance between the user 100 and each of the plurality of electronic devices 300 may refer to accurately measuring the distance between each of the electronic devices 300 and the user 100, but may also refer to how far each of the electronic devices 300 is from the user 100.

That is, referring to FIG. 2, a certain area may be assumed to be a range 1 A1 around the user 100, and a certain area beyond the range 1 A1 may be assumed to be a range 2 A2. In this way, by dividing the predetermined area along a direction away from the user 100, the distance between each area and the user may be estimated. Therefore, the distance between the specific electronic device located in the divided region and the user 100 may be estimated approximately.

Subsequently, based on the measured distance between the user 100 and the electronic devices 300, a device determination processor 340 may determine the device that is being called by the user 100 through the utterance of the user 100.

For example, upon a determination that the Lombard effect is reflected in the user utterance through the utterance style of the user 100 extracted by the data analysis processor 320, it may be assumed that the user 100 is calling the first device 301 located at a long distance from the user 100. Based on this, the first device 301 located at the position farthest from the user 100, as measured by the distance measurement processor 330, may be selected, and the operation of the first device 301 may be controlled.

On the contrary, upon a determination that the Lombard effect is not reflected in the user utterance through the utterance style of the user 100 extracted by the data analysis processor 320, it may be determined that the user 100 is calling an electronic device close to the user. Based on this, the operation of the electronic device located at the closest distance to the user 100, as measured by the distance measurement processor 330, is controlled.

The distance between the user 100 and the electronic devices 300 may be stored in the database 305 or/and the server 200. In addition, the distance between the user 100 and the electronic devices 300 may be automatically measured at predetermined intervals, but the measurement may also be performed whenever the user 100 utters a calling speech.

Meanwhile, when the device determination processor 340 determines which device the user 100 is calling, it may be determined that the first device 301 among the electronic devices 300 is located far away from the user 100 in response to a change in the speech feature of the user 100 being large.

That is, when the speech uttered by the user 100 has changed in comparison to the speech normally uttered by the user, it may be determined that the Lombard effect is reflected in the spoken utterance. Based on this, if the change in speech feature of the user 100 is large, like the Lombard effect, it may be determined that the user 100 is calling the first device 301 located far away from the user. Accordingly, it is possible to determine which device the user is calling based on the change in the speech feature of the user.

In this case, the criterion for determining the degree of change of the speech feature of the user may be based on a feature of the speech that the user normally utters. In other words, by comparing the speech feature of the pre-stored average utterance style with the speech feature of the user utterance calling the electronic device, it is determined which device the user is calling.

For example, a weight calculation module 350 may pre-learn speech changes related to speech utterance speed, base frequency, vowel duration time, and pitch of the spoken utterances of the user 100 in a normal state. Then, when the change in the utterance speed, the base frequency, the vowel duration time, the pitch, and the like extracted from the user utterance calling the first device 301 deviates from the training data, it may be determined that the speech change of the user 100 is large.

According to a specific embodiment, it may be determined whether the utterance time of the vowel section is greater than or equal to a preset time in speech uttered by the user toward the first device 301.

Figure 6A:
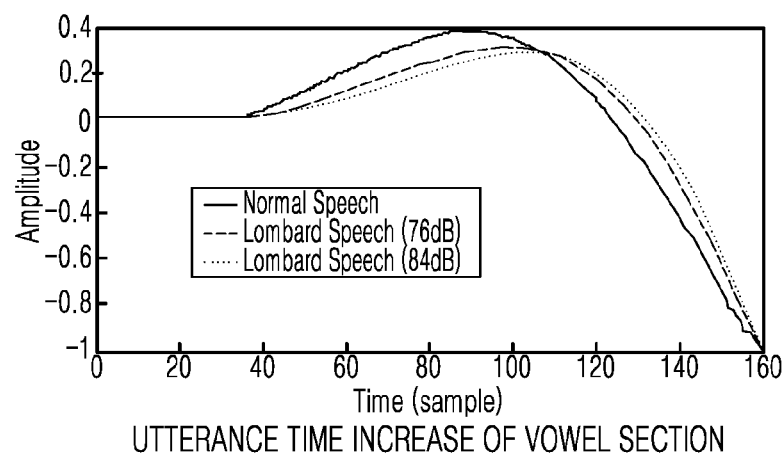
FIG. 6A to 6D is a graph for exemplarily illustrating a feature of a user utterance for controlling a device by a user's calling according to an embodiment of the present disclosure.

That is, referring to FIG. 6A, considering the utterance duration of the vowel section with respect to time, there is a feature according to the Lombard effect by which vowels are uttered long when uttering speech toward a distant object. Therefore, if the vowel utterance time lasts longer than the preset time, it may be determined that the user 100 is making an utterance toward the first device 301 located at a long distance from the user 100.

In addition, a base frequency may be derived from the speech signal of the utterance of the user 100 toward the first device 301, and a rising section may be extracted from the derived base frequency.

Figure 6B:
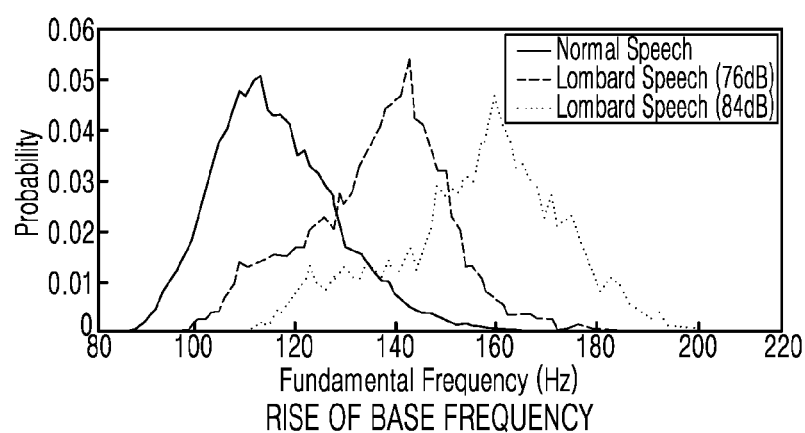

Specifically, considering the rise in base frequency over time with reference to FIG. 6B, this is due to a feature by which, according to the Lombard effect, when speech is uttered toward a distant object, the base frequency of the speaker's speech increases. Accordingly, the frequency of the speech uttered by the user 100 is extracted, and a section in which the base frequency increases is extracted from the extracted frequency. The extracted base frequency rising section may be analyzed as a section in which the user 100 is calling the first device 301 located far away from the user 100, and a speech calling the first device 301.

In addition, the weight calculation module 350 may extract a pitch from the speech signal of the utterance of the user 100 toward the first device 301, and extract a harmonic structure from the extracted pitch. In this case, as the sharpness of the extracted harmonic structure increases due to the Lombard effect, it can be determined that the utterance is being made toward a distant object.

Figure 6C:
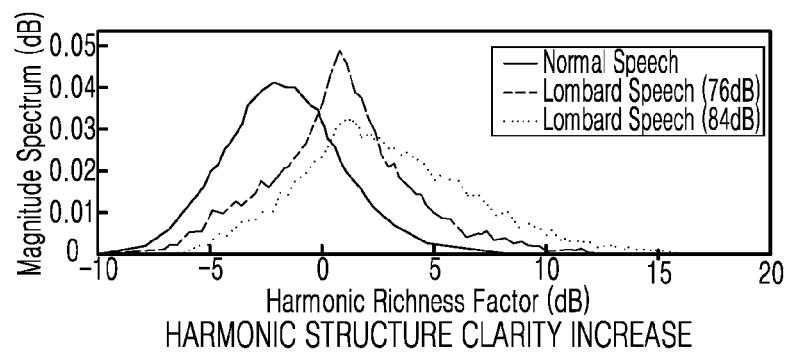

That is, considering the sharpness of the harmonic structure with respect to time with reference to FIG. 6C, according to the Lombard effect, as the sharpness of the pitch extracted from the speech uttered by the user 100 increases, it is determined that the user 100 is calling the first device 301 located far away from the user 100, and the operation of the first device 301 may be controlled.

In addition, the weight calculation module 350 may derive a spectrum from the speech signal of the utterance of the user 100 toward the first device 301, and extract a slope reduction section in which the slope decreases in the derived spectrum. The extracted slope reduction section refers to an area where energy is increased in the user sound range. The area where the energy increases means that the user is uttering speech slowly and clearly toward the first device 301, so that the first device 301 can recognize the speech of the user 100.

Figure 6D:
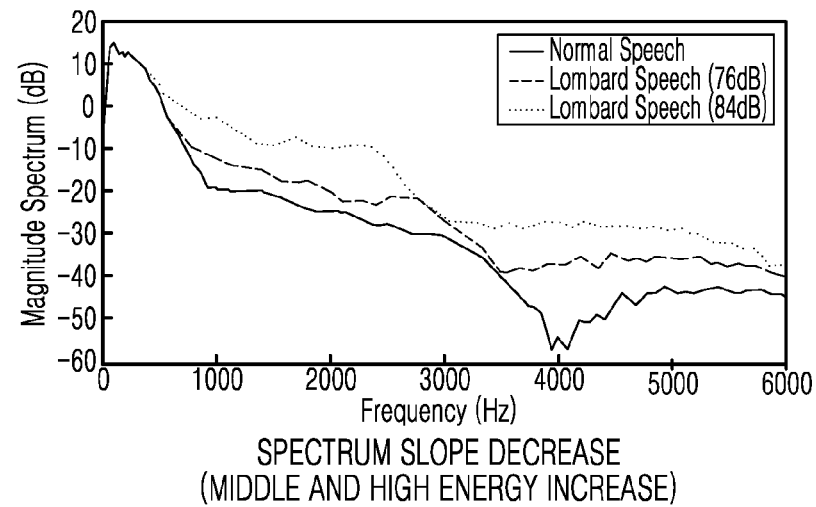

Therefore, as shown in FIG. 6D, according to the Lombard effect, as the slope of the spectrum extracted from the speech uttered by the user 100 decreases, the energy of the speech uttered by the user 100 may be determined to be higher, and the time point at which the slope of the spectrum decreases may be determined as the user 100 calling the first device 301 located far away from the user 100, and the operation of the first device 301 may be controlled.

As a result, when the user 100 utters a sentence without context, it is determined that the user 100 is calling the first device 301 located at a long distance from the user 100 as the change of the speech of the user making the utterance increases. Based on this, the first device 301 is selected based on the distance between the user 100 and the electronic device 300 measured by the distance measurement processor 330, and the operation of the first device 301 is controlled.

Figure 7:
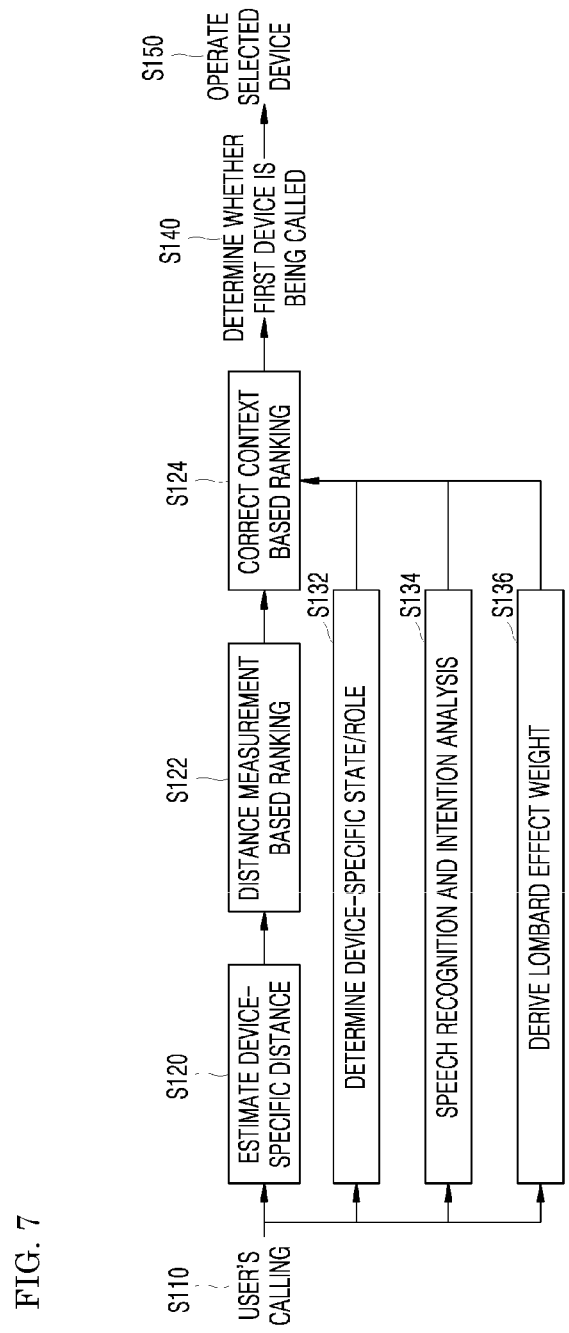
FIG. 7 is a flowchart for analyzing a calling intention of a user to select a first device according to an embodiment of the present disclosure.
Figure 8:
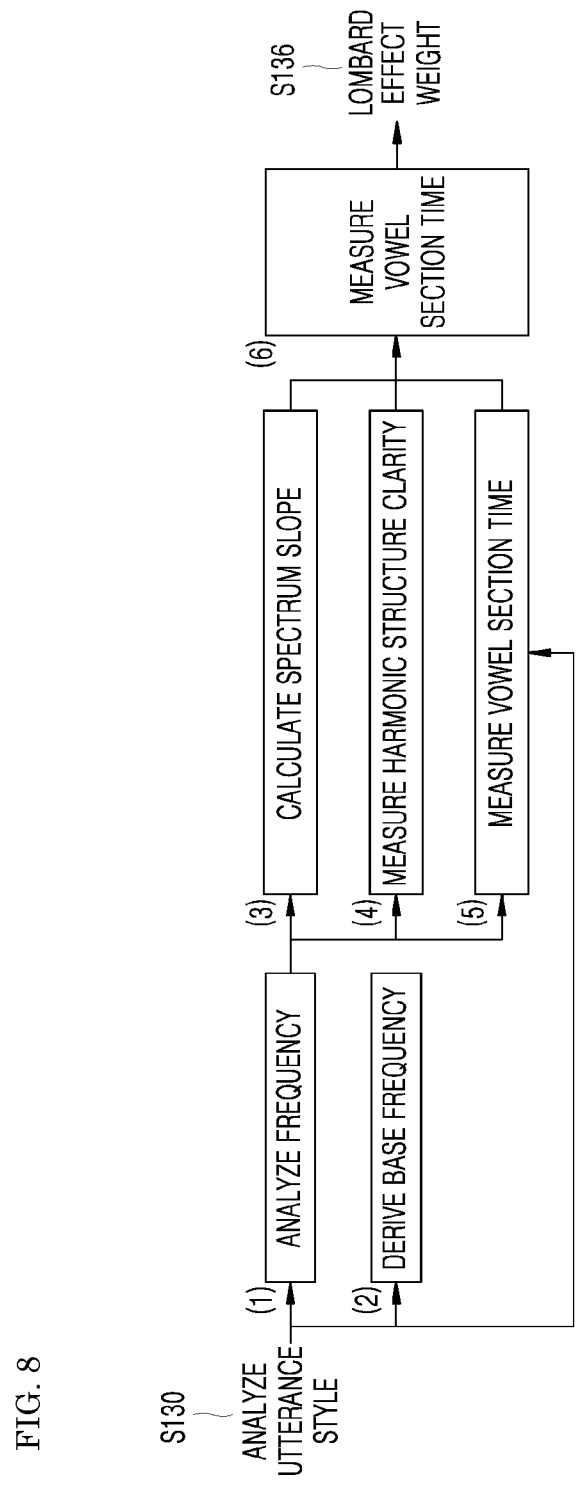
FIG. 8 is a flowchart for analyzing a user utterance reflecting the Lombard effect in order to analyze a calling intention of a user to select a first device according to an embodiment of the present disclosure.

FIG. 7 is a flowchart for analyzing a calling intention of a user to select a first device according to an embodiment of the present disclosure. FIG. 8 is a flowchart for analyzing a user utterance reflecting the Lombard effect in order to analyze a calling intention of the user to select a first device according to an embodiment of the present disclosure.

Referring to the drawings, the user 100 calls the first device 301 among the plurality of electronic devices 300 without context (S110). In order to estimate which device is the called first device 301, a distance between the user 100 and the plurality of electronic devices 300 is determined (S120).

In order to determine the distance between the electronic device 300 and the user 100, a ranking may be set by dividing the vicinity of the user 100 into a predetermined range (S122). For example, a certain area may be assumed to be a range 1 A1 around the user 100, and a certain area beyond the range 1 A1 may be assumed to be a range 2 A2. In this way, by dividing the predetermined area along a direction away from the user 100, the distance between each area and the user may be estimated.

For example, information on a distance between the user 100 and each electronic device 300 obtained from the distance measurement sensor included in each electronic device 300 may be collected.

Specifically, the electronic device 300 may include, for example, a vision sensor, a camera, and an infrared sensor, and the distance between the user 100 and each electronic device 300 may be measured using the disclosed vision sensor, camera, and infrared sensor.

Based on the distance information between the user 100 and each electronic device 300 obtained from the distance measuring sensor, the distance between the user 100 and each of the plurality of electronic devices 300 may be estimated.

Estimating the distance between the user 100 and each of the plurality of electronic devices 300 may refer to accurately measuring the distance between each of the electronic devices 300 and the user 100, but may also refer to how far each of the electronic devices 300 is from the user 100.

As described, when determining the position of the electronic device, the first device 301 corresponding to the calling of the user 100 may be determined by determining the role (for example, cleaning, washing, and the like) that each electronic device 300 performs (S132 and S134).

In a specific example of determining the role of the electronic device 300, when the user 100 utters "Turn off", the electronic device 300 that can operate in response to the "Turn off" is determined. Among the electronic devices 300 shown in FIG. 2, the electronic device 300 corresponding to the "Turn off" utterance of the user may be a TV, a robot cleaner, an air conditioner, or a washing machine.

Here, in the case of the refrigerator, as an electronic device for which switching off during operation should be minimized, the refrigerator may be excluded from the utterance context of the user 100 (S124). In addition, electronic devices that are already in the off state may be excluded from the utterance context of the user 100. As a result, the electronic devices that are already in the off state are excluded from the utterance context of the user 100, and the first device can thus be extracted more quickly.

Thereafter, it may be determined whether the Lombard effect is reflected in the utterance of the user 100 (S136). As described above, the Lombard effect refers to a phenomenon by which speakers involuntarily change their way of speaking to be able to better hear their voice when speaking in a noisy environment.

Specifically, referring to FIG. 8, for example, this means a case where the user 100 pronounces each word slowly in the sentence "Turn off" uttered by the user 100.

In addition, the Lombard effect includes a feature by which the slope of the spectrum of the frequency extracted from the speech signal of the user utterance is reduced. The section where the spectral slope decreases corresponds to the section where the energy increases. The section where the spectral slope of the frequency extracted from the speech signal of the user utterance is reduced based on this feature may be referred to as a section where the energy of the user utterance is increased ((1) and (3) of FIG. 8).

In addition, the Lombard effect includes a feature by which the base frequency of the frequency extracted from the speech signal of the user utterance rises. As an example, according to this feature, the base frequency increases when the user utters "Turn off" ((2) of FIG. 8).

In addition, the Lombard effect includes a feature by which the harmonic structure of the pitch of the frequency extracted from the speech signal of the user utterance becomes clearer ((4) of FIG. 8). All sounds have a component that is a constant multiple of a frequency component that determines the pitch. Harmonics refers to all of the components of this constant multiple. Based on this feature, the Lombard effect has a feature by which the harmonic structure becomes clearer, that is, the pitch is increased. As the pitch becomes higher, this may be referred to as a signal having greater auditory stimulus, and it may mean that a user is making an utterance with a louder sound. As the pitch is higher, it may be determined that the user is calling the first device 301 located far away from the user.

In addition to these characteristics, the Lombard effect includes a feature by which an utterance time of a vowel in the speech of the user increases ((5) of FIG. 8). This means that, when the user utters "Turn off", the utterance time of the "u" and "o" vowels of "Turn off" increase.

In relation to this feature of the Lombard effect, through the weight calculation neural network, a Lombard effect weight may be given to the speech uttered by the user ((6) of FIG. 8). This is because as the Lombard effect weight becomes higher, it may be analyzed that the user utterance is selecting the first device located far away from the user.

Thereafter, the context of the speech uttered by the user with respect to a distance between the user and the electronic device 300 and the Lombard effect weight is inferred, and according to the inferred context, the first device 301 being called by the user 100 may be selected (S140).

Specifically, when the user utters "Turn off" and it is determined that the Lombard effect is reflected in the "Turn off" uttered by the user, the user may determine that the first device 301 is located far away from the user.

As a result of this, electronic devices that can be operated in response to the "Turn off" uttered by the user are extracted (for example, a washing machine, a TV, and an air conditioner), and among the extracted electronic devices, the operation of the air conditioner (see FIG. 2), which is the electronic device farthest from the user, may be controlled (for example, turned off) (S150).

Figure 9:
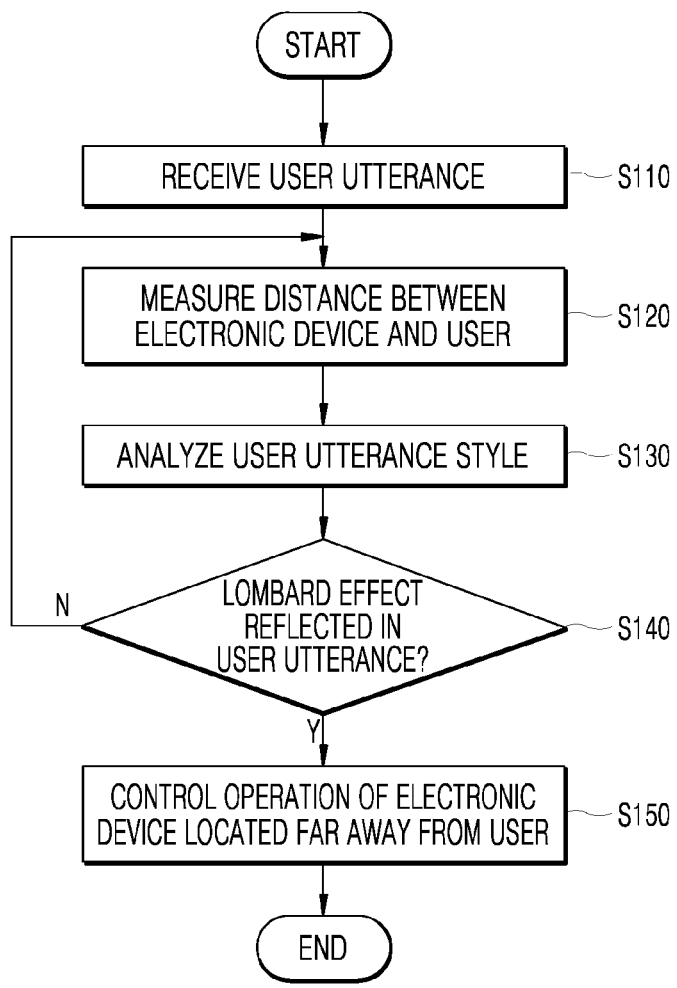
FIG. 9 is a flowchart illustrating a process of controlling a first device by a user's calling according to an embodiment of the present disclosure.

FIG. 9 is a flowchart illustrating a process of controlling a first device by a user's calling according to an embodiment of the present disclosure.

Referring to FIG. 9, in order to determine a response of a first device being called by a user, a plurality of electronic devices 300 may receive an utterance of the user 100 (S110). Specifically, the user 100 calls the first device 301 among the plurality of electronic devices 300 without context, and receives the calling speech of the user 100 from the plurality of electronic devices 300.

Thereafter, the distance between the user 100 and the plurality of electronic devices 300 is measured (S120). The measured distance between the user 100 and the plurality of electronic devices 300 may be a reference for selecting the first device 301 corresponding to the speech feature of the user 100.

When the distance between the user 100 and the plurality of electronic devices 300 is measured, a role of each electronic device 300 may be determined. That is, when the user utters "Turn off", an electronic device that can perform an operation corresponding to "Turn off" is extracted.

At this time, an electronic device (for example, a refrigerator) in which an operation corresponding to "Turn off" should not be performed is not determined to be an electronic device corresponding to the user utterance. In addition, an electronic device that is already in the off state is not determined to be an electronic device corresponding to the user utterance. Based on these criteria, an electronic device in which an operation corresponding to user utterance should be performed can be extracted.

Thereafter, a style of the user utterance may be analyzed based on the user speech feature extracted from the user utterance through the speech recognition neural network (S130).

The speech recognition neural network refers to a neural network that extracts a speech feature of a user when the user utters a sentence or a word.

In addition, the user utterance style refers to a change in the spoken utterance of the user. Examples of such a change may include a change of a speed at which a user utters a sentence or word, a stress in which a certain uttered sentence or word is pronounced strongly or weakly, a pause time (section) between words, a pitch, and a vowel section utterance time of a word.

Based on the extracted user utterance style and the distance between the user 100 and the plurality of electronic devices 300, it may be determined whether the user utterance is calling the first device 301 among the plurality of electronic devices 300 (S140).

In order to determine whether the user is calling the first device 301, it may be determined whether the Lombard effect is reflected in the user utterance. The Lombard effect refers to a phenomenon by which speakers involuntarily change their way of speaking to be able to better hear their voice when speaking in a noisy environment.

Features of the Lombard effect include reducing the utterance speed, increasing the base frequency extracted from the speech signal, increasing the pitch, increasing the spectral slope, and increasing the vowel utterance time of the speech uttered by the user.

For example, such effects mean that the user pronounces "Turn off" slowly, so that the user's voice can be correctly received by the first device 301.

In relation to these features of the Lombard effect, through the weight calculation neural network, a Lombard effect weight may be given to the speech uttered by the user. As the Lombard effect weight becomes higher, it may be analyzed that the user utterance is selecting the first device located far away from the user.

Thereafter, based on the distance between the user and the electronic device 300 and the Lombard effect weight, the context of the user utterance language is inferred, and according to the inferred context, the first device 301 being called by the user 100 may be selected, and the operation of the selected first device 301 may be controlled (S150).

For example, if the user utters the "u" and "o" vowels in the sentence "Turn off" for longer than a threshold time learned in the speech recognition neural network, the weight calculation neural network may determine that the user is calling an electronic device located far away from the user.

At this time, the electronic device that is located at the farthest distance from the user among the plurality of electronic devices measured by the distance measurement processor 330, and which is capable of performing an operation corresponding to the calling speech of the user, may be extracted. As an example, it may be determined that the air conditioner (see 30 of FIG. 2) is located at the farthest distance from the user and is capable of performing the operation corresponding to the calling speech of the user, and the operation of the air conditioner may thus be switched from on to off.

As such, even when a user calls a device located far away from the user without any separate context information, by selecting and using speech recognition neural networks and weight calculation neural networks to operate a device far away from the user, it is possible to recognize a calling speech of a user selecting a device located far away from the user among a plurality of electronic devices.

In addition, based on the user speech feature that reflects the Lombard effect, the device can be operated at a distance from the user. That is, it is possible to determine that a device located far away from the user is being called by applying the Lombard effect to the speech feature of the user. Based on this, if the user speech feature reflecting the Lombard effect is determined to be calling a device located far away from the user, the operation corresponding to the user's calling can be performed in the device located far away from the user.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for controlling a device according to a user's calling, the method comprising:
   receiving a user utterance collected by a plurality of electronic devices;
   measuring a distance between the user and the plurality of electronic devices;
   extracting a first electronic device and a second electronic device configured to perform an operation corresponding to the user utterance among the plurality of electronic devices;
   analyzing a style of the user utterance based on a user speech feature extracted from the user utterance through a speech recognition neural network;
   in response to the style of the user utterance corresponding to a pre-stored average utterance style of the user and the first electronic device being located a shorter distance away from the user than the second electronic device, selecting the first electronic device as an individual target device and controlling an operation of the first electronic device based on the user utterance while the second electronic device does not respond to the user utterance; and in response to the style of the user utterance being different than the pre-stored average utterance style of the user and the second electronic device being located a farther distance away from the user than the first electronic device, selecting the second electronic device as the individual target device and controlling an operation of the second electronic device based on the user utterance while the first electronic device does not respond to the user utterance, wherein the pre-stored average utterance style of the user is based on a plurality of spoken utterances of the user, and wherein the method further comprises:

comparing a pitch of the style of the user utterance with a pitch of the pre-stored average utterance style; and in response to the pitch of the style of the user utterance being higher than the pitch of the pre-stored average utterance style, selecting the at least one electronic device, which is located farther away from the user than one or more other devices among the at least one electronic device, as the individual target device.

2. The method of claim 1, wherein the analyzing of the style of the user utterance comprises:

extracting, through a weight calculation neural network, at least one user speech feature among an utterance speed, a pronunciation stress, a pause section, a pitch, a base frequency, an utterance time of a vowel section, a signal to noise ratio (SNR), or an intonation; and comparing the extracted at least one speech feature with a speech feature of the pre-stored average utterance style for the user.

3. The method of claim 2, wherein the extracting the at least one user speech feature comprises determining whether the utterance time of the vowel section in the user utterance is greater than or equal to a preset time.

4. The method of claim 2, wherein the extracting the at least one user speech feature comprises:

deriving a base frequency from a speech signal of the user utterance; and extracting a rising section from the derived base frequency.

5. The method of claim 2, wherein the comparing of the speech feature comprises determining whether a harmonic structure in a speech signal of the user utterance has increased relative to a harmonic structure in a speech signal of the pre-stored average utterance style.

6. The method of claim 2, wherein the extracting the at least one user speech feature comprises:

deriving a spectrum from the speech signal of the user utterance; and extracting a slope reduction section from the derived spectrum.

7. The method of claim 1, wherein the measuring of the distance comprises:

collecting distance information on a distance between the user and each of the plurality of electronic devices, which is obtained from a distance measurement sensor of each of the plurality of electronic devices; and estimating the distance between the user and each of the plurality of electronic devices based on the collected distance information.

8. The method of claim 1, wherein the analyzing the style of the user utterance comprises:

selecting utterance data of the user received from an electronic device located at a closest distance from the user, among utterance data of the user collected by the plurality of electronic devices; and extracting a user speech feature from the selected utterance data through the speech recognition neural network.

9. The method of claim 8, wherein the determining the target device comprises determining that a device located at a farthest distance from the user is being called in response to the change in the style of the user utterance being greater than a predetermined amount.

10. A method for determining a response of a first device to a user's calling, the method comprising:

receiving a user utterance;

measuring a distance between the user and the first device;

determining whether the first device can perform an operation corresponding to the user utterance;

analyzing a style of the user utterance based on a user speech feature extracted from the user utterance through a speech recognition neural network; and in response to the style of the user utterance being different than a pre-stored average utterance style of the user and the first electronic device being located a farther distance away from the user than one or more other electronic devices able to respond to the user utterance, selecting the first electronic device as an individual target device and controlling an operation of the first electronic device based on the user utterance while the one or more other electronic devices do not respond to the user utterance, wherein the pre-stored average utterance style of the user is based on a plurality of spoken utterances of the user, and wherein the method further comprises:

comparing a pitch of the style of the user utterance with a pitch of the pre-stored average utterance style; and in response to the pitch of the style of the user utterance being higher than the pitch of the pre-stored average utterance style, selecting the at least one electronic device, which is located farther away from the user than one or more other devices among the at least one electronic device, as the individual target device.

11. The method of claim 10, wherein the analyzing the style of the user utterance comprises:

extracting at least one user speech feature among an utterance speed, a pronunciation stress, a pause section, a pitch, a base frequency, an utterance time of a vowel section, a signal to noise ratio (SNR), or an intonation; and comparing the extracted at least one speech feature with a speech feature of the pre-stored average utterance style for the user.

12. The method of claim 10, wherein the measuring of the distance comprises:

collecting distance information on a distance between the user and each of the plurality of electronic devices, which is obtained from a distance measurement sensor of each of the plurality of electronic devices; and estimating the distance between the user and each of the plurality of electronic devices based on the collected distance information.

13. The method of claim 10, wherein the analyzing the style of the user utterance comprises:

selecting utterance data of the user collected by the first device; and extracting a user speech feature from the selected utterance data through the speech recognition neural network.

14. The method of claim 13, wherein the determining the first device as the target device comprises determining that the first device is a device located at a farthest distance from the user in response to the change in the style of the user utterance being greater than a predetermined amount.

15. A device configured to determine a response to a user's calling, the device comprising:
at least one processor; and
a memory connected to the at least one processor, the memory storing a pre-stored average utterance style for a user,
wherein the processor is configured to:
 receive a user utterance,
 measure a distance between the user and the device,
 determine whether the device can perform an operation corresponding to the user utterance,
 analyze a style of the user utterance based on a user speech feature extracted from the user utterance through a speech recognition neural network, and
 in response to the style of the user utterance being different than a pre-stored average utterance style of the user and the device being located a farther distance away from the user than one or more other devices able to respond to the user utterance, select the device as an individual target device and control an operation of the device based on the user utterance while the one or more other devices do not respond to the user utterance,
wherein the pre-stored average utterance style of the user is based on a plurality of spoken utterances of the user, and
wherein the processor is further configured to:
compare a pitch of the style of the user utterance with a pitch of the pre-stored average utterance style; and
in response to the pitch of the style of the user utterance being higher than the pitch of the pre-stored average utterance style, select the at least one electronic device, which is located farther away from the user than one or more other devices among the at least one electronic device, as the individual target device.

16. The device of claim 15, wherein the processor is further configured to:
extract at least one user speech feature among an utterance speed, a pronunciation stress, a pause section, a pitch, a base frequency, an utterance time of a vowel section, a signal to noise ratio (SNR), or an intonation; and
compare the extracted at least one speech feature with a speech feature of the pre-stored average utterance style for the user.

17. The device of claim 15, wherein the processor is further configured to collect distance information on a distance between the user and each of a plurality of electronic devices, which is obtained from a distance measurement sensor of each of the plurality of electronic devices, and estimate a distance between the user and each of the plurality of electronic devices based on the collected distance information, when the distance is measured.

18. The device of claim 15, wherein the processor is further configured to select utterance data of the user collected by the device, and extract a user speech feature from the selected utterance data through the speech recognition neural network.

19. The device of claim 18, wherein the processor is further configured to determine that the device is a device at a farthest distance from the user in response to the change in the style of the user utterance being greater than a predetermined amount.

* * * * *